(12) United States Patent
Brodersen et al.

(10) Patent No.: US 8,607,144 B2
(45) Date of Patent: Dec. 10, 2013

(54) MONITOR CONFIGURATION FOR MEDIA DEVICE

(75) Inventors: Rainer Brodersen, San Jose, CA (US); Jeffrey Robbin, Los Altos, CA (US); Thomas Michael Madden, Sunnyvale, CA (US); Kevin Arnold, Los Gatos, CA (US); Ian Hendry, San Jose, CA (US)

(73) Assignee: Apple Inc., Cupertino, CA (US)

( * ) Notice: Subject to any disclaimer, the term of this patent is extended or adjusted under 35 U.S.C. 154(b) by 581 days.

(21) Appl. No.: 11/676,150

(22) Filed: Feb. 16, 2007

(65) Prior Publication Data

US 2008/0165202 A1    Jul. 10, 2008

Related U.S. Application Data

(63) Continuation-in-part of application No. 11/621,048, filed on Jan. 8, 2007.

(51) Int. Cl.
*G06F 3/00* (2006.01)

(52) U.S. Cl.
USPC ...................................................... 715/718

(58) Field of Classification Search
USPC ...................................................... 715/718
See application file for complete search history.

(56) References Cited

U.S. PATENT DOCUMENTS

| 5,283,864 A | 2/1994 | Knowlton |
| 5,303,388 A | 4/1994 | Kreitman et al. |
| 5,345,543 A | 9/1994 | Capps et al. |
| 5,396,590 A | 3/1995 | Kreegar |
| 5,452,414 A | 9/1995 | Rosendahl et al. |
| 5,864,868 A | 1/1999 | Contois |
| 6,006,227 A | 12/1999 | Freeman et al. |
| 6,346,951 B1 | 2/2002 | Mastronardi |
| 6,638,313 B1 | 10/2003 | Freeman et al. |

(Continued)

FOREIGN PATENT DOCUMENTS

| EP | 1161084 | 5/2001 |
| EP | 1244301 | 9/2002 |

(Continued)

OTHER PUBLICATIONS

Barber, Brian and Martin Grasdal and Thomas W. Shinder. "Configuring and Troubleshooting Windows XP Professional". 2001. Syngress Publishing, Inc. p. 98-99.*

(Continued)

*Primary Examiner* — Aaron M Richer
(74) *Attorney, Agent, or Firm* — Schwegman Lundberg & Woessner, P.A.

(57) ABSTRACT

A display mode can be selected by identifying a plurality of display modes supported by a media client, wherein the plurality of display modes comprise safe display modes; generating a user interface including a test image and a plurality of commands in accordance with a selected display mode of the plurality of display modes, wherein the user interface is output to a display device; receiving user input selecting one of the plurality of commands; and configuring an operating display mode of the media client in accordance with the received user input. Configuring an operating display mode further can comprise determining that the received user input confirms the selected display mode and configuring the media client to set the selected display mode as the operating display mode. Further, generating a user interface can comprise presenting a display timer indicating a time remaining until a display mode change.

24 Claims, 9 Drawing Sheets

(56) References Cited

U.S. PATENT DOCUMENTS

| | | | |
|---|---|---|---|
| 6,725,427 B2 | 4/2004 | Freeman et al. | |
| 6,768,999 B2 | 7/2004 | Prager et al. | |
| 7,055,104 B1 | 5/2006 | Billmaier et al. | |
| 7,085,590 B2 | 8/2006 | Kennedy et al. | |
| 7,176,980 B2 * | 2/2007 | Stone et al. | 348/558 |
| 7,231,607 B2 | 6/2007 | Neely et al. | |
| 7,581,186 B2 | 8/2009 | Dowdy et al. | |
| 7,812,890 B2 * | 10/2010 | Chiu | 348/705 |
| 2001/0015719 A1 | 8/2001 | Van et al. | |
| 2002/0030699 A1 | 3/2002 | Van | |
| 2002/0067373 A1 | 6/2002 | Roe et al. | |
| 2002/0067376 A1 | 6/2002 | Martin et al. | |
| 2002/0080180 A1 | 6/2002 | Mander et al. | |
| 2002/0113824 A1 | 8/2002 | Myers | |
| 2003/0020671 A1 | 1/2003 | Santoro et al. | |
| 2003/0112367 A1 * | 6/2003 | Kang et al. | 348/441 |
| 2004/0013416 A1 | 1/2004 | Mok | |
| 2004/0070593 A1 | 4/2004 | Neely et al. | |
| 2004/0146287 A1 * | 7/2004 | Jeon | 386/125 |
| 2004/0199582 A1 | 10/2004 | Kucharewski et al. | |
| 2005/0091596 A1 | 4/2005 | Anthony et al. | |
| 2005/0160468 A1 * | 7/2005 | Rodriguez et al. | 725/109 |
| 2006/0007359 A1 * | 1/2006 | Douangphachanh | 348/554 |
| 2006/0132473 A1 * | 6/2006 | Fuller et al. | 345/204 |
| 2006/0150123 A1 | 7/2006 | Goodwin et al. | |
| 2006/0195790 A1 | 8/2006 | Beaupre et al. | |
| 2007/0033537 A1 | 2/2007 | Mander et al. | |
| 2007/0044036 A1 | 2/2007 | Ishimura et al. | |
| 2007/0271508 A1 | 11/2007 | Audet | |
| 2008/0036743 A1 | 2/2008 | Westerman et al. | |
| 2008/0062141 A1 | 3/2008 | Chandhri | |
| 2008/0066135 A1 | 3/2008 | Brodersen et al. | |
| 2008/0165083 A1 | 7/2008 | Brodersen et al. | |
| 2009/0002335 A1 | 1/2009 | Chaudhri | |
| 2009/0177989 A1 | 7/2009 | Ma et al. | |
| 2009/0307623 A1 | 12/2009 | Agarawala et al. | |
| 2009/0319949 A1 | 12/2009 | Dowdy et al. | |

FOREIGN PATENT DOCUMENTS

| | | |
|---|---|---|
| EP | 1677497 A1 | 7/2006 |
| WO | WO 2006/013485 A2 | 2/2006 |
| WO | WO 2006/020305 A2 | 2/2006 |
| WO | WO 2007/121557 A1 | 11/2007 |
| WO | WO 2008/033773 A1 | 3/2008 |
| WO | WO 2008/033853 A2 | 3/2008 |
| WO | WO-2008086370 A2 | 7/2008 |
| WO | WO-2008086370 A3 | 7/2008 |
| WO | WO-2008086371 A3 | 7/2008 |

OTHER PUBLICATIONS

Kuhnen Leila, Authorized officer, European Patent Office, Application No. PCT/US2008/050537, filed Jan. 8, 2008, in International Search Report and Written Opinion of the International Searching Authority, mailed Jul. 7, 2008, 12 pages.

Nickitas-Etienne, Athina, Authorized officer, The International Bureau of WIPO, Application No. PCT/US2008/050537, filed Jan. 8, 2008, in International Preliminary Report on Patentability, mailed Jul. 23, 2009, 8 pages.

United States Patent and Trademark Office, U.S. Appl. No. 11/621,048, filed Jan. 8, 2007, in Office Action mailed Mar. 26, 2010, 15 pages.

Kuhnen Leila, Authorized officer, European Patent Office, Application No. PCT/US2008/050538, filed Jan. 8, 2008, in International Search Report and Written Opinion of the International Searching Authority, mailed Jul. 11, 2008, 34 pages.

Nickitas-Etienne, Athina, Authorized officer, The International Bureau of WIPO, Application No. PCT/US2008/050538, filed Jan. 8, 2008, in International Preliminary Report on Patentability, mailed Jul. 23, 2009, 7 pages.

"CoverFlow", www.steelskies.com/coverflow/, downloaded Jun. 15, 2006.

Enright, "Dissatisfaction Sows Innovation—Visual Browsing in iTunes", The Treehouse + The Cave, Dec. 29, 2004, 1-4 pages.

Enright, "Meet CoverFlow", The Treehouse + The Cave, Aug. 13, 2005, 1-2 pages.

Enright, "Visual Browsing on a iBook DS", The Treehouse + The Cave, Dec. 29, 2004, 1 pg.

Sawyer, "Get with the CoverFlow", The Olive Press, Dec. 8, 2005, 1 pg.

Rose, "Music in the Home: Interfaces for Music Applications", Personal Technologies, v. 4, No. 1,2000, pp. 45-53.

Hinze, Cody, "Cover Flow—A Beautiful Way to Browse your MP3s", Noise Magazine blog, Feb. 5, 2006, pp. 1-2.

"U.S. Appl. No. 11/621,048, 312 Amendment filed Jan. 17, 2012", 11 pgs.

"U.S. Appl. No. 11/621,048, Examiner Interview Summary mailed Feb. 29, 2010", 3 pgs.

"U.S. Appl. No. 11/621,048, Final Office Action mailed Mar. 26, 2010", 15 pgs.

"U.S. Appl. No. 11/621,048, Non Final Office Action mailed Mar. 23, 2011", 6 pgs.

"U.S. Appl. No. 11/621,048, Non Final Office Action mailed Oct. 13, 2009", 13 pgs.

"U.S. Appl. No. 11/621,048, Notice of Allowance mailed Jan. 24, 2013", 5 pgs.

"U.S. Appl. No. 11/621,048, Notice of Allowance mailed Oct. 18, 2011", 5 pgs.

"U.S. Appl. No. 11/621,048, Response filed Jun. 23, 2011 to Non Final Office Action mailed Mar. 26, 2011", 9 pgs.

"U.S. Appl. No. 11/621,048, Response filed Sep. 24, 2010 to Final Office Action mailed Mar. 26, 2010", 9 pgs.

"U.S. Appl. No. 11/621,048, Response filed Dec. 16, 2009 to Non Final Office Action mailed Oct. 13, 2009", 13 pgs.

"International Application Serial No. PCT/US2008/050537, International Preliminary Report on Patentability mailed Jul. 23, 2009", 7 pgs.

"International Application Serial No. PCT/US2008/050537, International Search Report mailed Jul. 7, 2008", 2 pgs.

"International Application Serial No. PCT/US2008/050537, Written Opinion mailed Jul. 7, 2008", 6 pgs.

"International Application Serial No. PCT/US2008/050538, International Preliminary Report on Patentability mailed Jul. 23, 2009", 6 pgs.

"International Application Serial No. PCT/US2008/050538, International Search Report mailed Jul. 11, 2008", 2 pgs.

"International Application Serial No. PCT/US2008/050538, Written Opinion mailed Jul. 11, 2008", 5 pgs.

Richer, Aaron M, et al., "Monitor Configuration for Media Device", U.S. Appl. No. 11/676,150, filed Feb. 16, 2007, 14 pgs.

* cited by examiner

MONITOR CONFIGURATION FOR MEDIA DEVICE

CROSS-REFERENCE TO RELATED APPLICATION

This application is a continuation-in-part of U.S. application Ser. No. 11/621,048, filed Jan. 8, 2007, entitled MONITOR CONFIGURATION FOR MEDIA DEVICE, which is hereby incorporated by reference.

TECHNICAL FIELD

The present disclosure relates to media processing devices, and to systems and methods for performing configuration and error recovery in media processing devices.

BACKGROUND

Media processing devices can be configured to perform playback of one or more types of media, including audio, images, video, and mixed media. The playback can be performed through one or more embedded outputs, such as speakers and a display, included in the media processing device or through one or more external presentation devices coupled to the media processing device. For example, a media processing device, such as a digital video recorder, can be coupled to a television to present playback of a media stream including video and audio information, such as a movie or a television program. Alternatively, the digital video recorder can be configured to separately provide video information to a television and audio information to an audio receiver that is coupled to one or more speakers.

A wide variety of presentation devices that can be coupled to a media processing device are presently available. Further, presentation device capabilities can vary based on numerous factors, including cost, manufacturer, and intended use. For example, televisions can be configured to support one or more analog video standards, such as NTSC or PAL/SECAM. A television also can be configured to support one or more digital video standards, such as High Definition Television (HDTV) and Enhanced Definition Television (EDTV). Further, a video transmission standard can include more than one resolution. For example, HDTV supports numerous resolutions, including 480p, 720p, and 1080i, where 480p denotes a progressive scan of 480 vertical scanning lines and 1080i denotes an interlaced scan of 1,080 vertical scanning lines. Audio information also can be output in a variety of formats, such as stereo, Dolby Digital, and Dolby Digital EX.

In order to ensure that a media processing device can be used with a variety of separate presentation devices, the media processing device can be configured to output information, such as a media stream, in accordance with a plurality of formats. Thus, output information can be provided to a coupled device in a compatible format. The media processing device also can include one or more selection settings, such as settings accessible through a user interface, to allow a user to specify the desired output format. As such, if the media processing device and the coupled presentation device share multiple common formats, the desired format can be selected. Further, if the presentation device to which the media processing device is coupled changes, such as when a monitor is upgraded, the media processing device can be reconfigured to provide output in an appropriate format to the new presentation device.

SUMMARY

A media processing device, such as a media client that receives media content from one or more sources, can be configured to present output information to one or more presentation devices. Further, a media client can be configured to operate in accordance with a set of associated instructions. Many of these techniques and methods rely on configuring the media client to present output information, such as one or more media streams, in a format that is compatible with the presentation device receiving the information. In order to reduce the time required to select a compatible output format and to prevent configuration errors, the present inventors recognized that it was beneficial to automatically detect one or more output formats that are compatible with a coupled presentation device and to configure the media client to utilize one or more of the detected compatible output formats.

The present inventors also recognized the need to automatically detect when a coupled presentation device has changed and to reconfigure the media client to utilize one or more output formats that are compatible with the coupled presentation device. Further, the need to automatically detect and recover from a problem affecting the operation of the media client also is recognized. Accordingly, the techniques and apparatus described here implement algorithms for configuring a media client.

In general, in one aspect, the techniques can be implemented to include identifying a plurality of display modes supported by a media client, wherein the plurality of display modes comprise safe display modes; generating a user interface including a test image and a plurality of commands in accordance with a selected display mode of the plurality of display modes, wherein the user interface is output to a display device; receiving user input selecting one of the plurality of commands; and configuring an operating display mode of the media client in accordance with the received user input.

The techniques also can be implemented such that configuring an operating display mode further comprises determining that the received user input confirms the selected display mode and configuring the media client to set the selected display mode as the operating display mode. Additionally, the techniques can be implemented such that configuring an operating display mode further comprises determining that the received user input cancels the selected display mode and restoring the operating display mode of the media client to a previous display mode.

The techniques also can be implemented such that generating a user interface further comprises presenting a display timer indicating a time remaining until a display mode change. Further, the techniques can be implemented to include determining that the display timer has elapsed without user input having been received and generating the user interface in accordance with another display mode of the plurality of display modes.

The techniques also can be implemented to include detecting a user input corresponding to the plurality of commands and setting the display timer to a predetermined value in response to the detected user input. Further, the techniques can be implemented such that the selected display mode comprises a default display mode associated with the media client. Additionally, the techniques can be implemented such that the plurality of display modes include one or more unsafe display modes. The techniques further can be implemented such that identifying a plurality of display modes further comprises filtering the plurality of display modes based on identification data corresponding to the display device.

In general, in another aspect, the techniques can be implemented as a computer program product, encoded on a computer-readable medium, operable to cause data processing apparatus to perform operations comprising identifying a plurality of display modes supported by a media client, wherein the plurality of display modes comprise safe display modes; generating a user interface including a test image and a plurality of commands in accordance with a selected display mode of the plurality of display modes, wherein the user interface is output to a display device; receiving user input selecting one of the plurality of commands; and configuring an operating display mode of the media client in accordance with the received user input.

The techniques also can be implemented to be further operable to cause data processing apparatus to perform operations comprising determining that the received user input confirms the selected display mode and configuring the media client to set the selected display mode as the operating display mode. Additionally, the techniques can be implemented to be further operable to cause data processing apparatus to perform operations comprising determining that the received user input cancels the selected display mode and restoring the operating display mode of the media client to a previous display mode.

The techniques also can be implemented to be further operable to cause data processing apparatus to perform operations comprising presenting a display timer indicating a time remaining until a display mode change. Additionally, the techniques can be implemented to be further operable to cause data processing apparatus to perform operations comprising determining that the display timer has elapsed without user input having been received and generating the user interface in accordance with another display mode of the plurality of display modes.

The techniques also can be implemented to be further operable to cause data processing apparatus to perform operations comprising detecting a user input corresponding to the plurality of commands and setting the display timer to a predetermined value in response to the detected user input. Further, the techniques can be implemented such that the selected display mode comprises a default display mode associated with the media client. Additionally, the techniques can be implemented such that the plurality of display modes include one or more unsafe display modes. The techniques also can be implemented to be further operable to cause data processing apparatus to perform operations comprising filtering the plurality of display modes based on identification data corresponding to the display device.

These general and specific techniques can be implemented using an apparatus, a method, a system, or any combination of an apparatus, methods, and systems. The details of one or more implementations are set forth in the accompanying drawings and the description below. Further features, aspects, and advantages will become apparent from the description, the drawings, and the claims.

BRIEF DESCRIPTION OF THE DRAWINGS

Like reference symbols indicate like elements throughout the specification and drawings.

DETAILED DESCRIPTION

Figure 1:
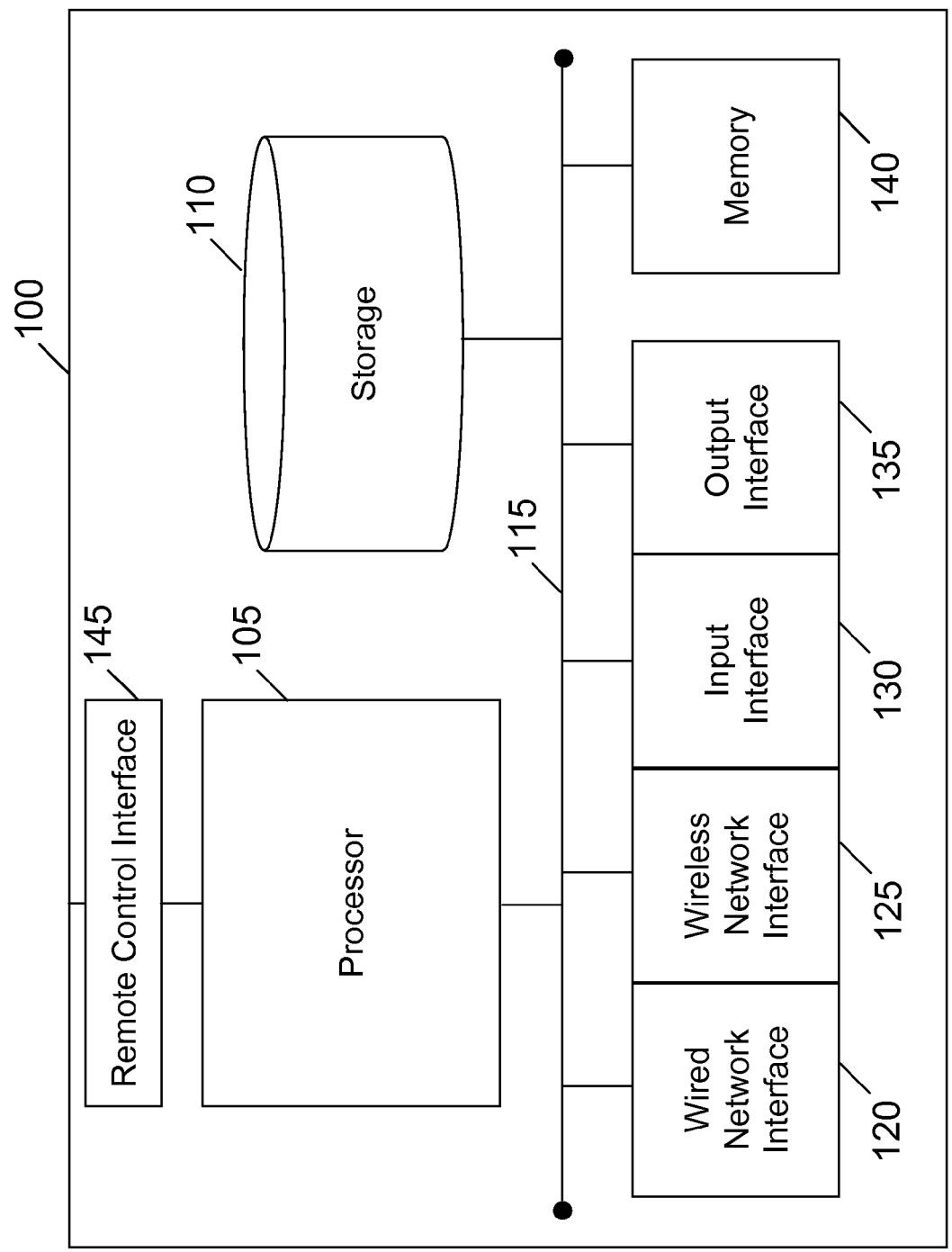
FIG. 1 presents a diagram of a media client.

FIG. 1 presents a media client 100 that can be configured to present one or more types of media through an associated presentation device, including audio, video, images, or any combination thereof. The media client 100 includes a processor 105 configured to control the operation of the media client 100. For example, the processor 105 can control communications with one or more media servers to receive media for playback. The media can be received through push and/or pull operations, including through downloading and streaming. The processor 105 also can be configured to generate output signals for presentation, such as one or more streams representing media content or an interface for interacting with a user.

The media client 100 also includes a storage device 110 that can be configured to store information including media, configuration data, and operating instructions. The storage device 110 can be any type of non-volatile storage, including a hard disk device or a solid-state drive. For example, media received from an external media server can be stored on the storage device 110. The received media thus can be locally accessed and processed. Further, configuration information, such as the resolution of a coupled display device or information identifying an associated media server, can be stored on the storage device 110. Additionally, the storage device 110 can include operating instructions executed by the processor 105 to control operation of the media client 100. In an implementation, the storage device 110 can be divided into a plurality of partitions, wherein each partition can be utilized to store one or more types of information and can have custom access control provisions.

A communication bus 115 couples the processor 105 to the other components and interfaces included in the media client 100. The communication bus 115 can be configured to permit unidirectional and/or bidirectional communication between the components and interfaces. For example, the processor 105 can retrieve information from and transmit information to the storage device 110 over the communication bus 115. In an implementation, the communication bus 115 can be comprised of a plurality of busses, each of which couples at least one component or interface of the media client 100 with another component or interface.

The media client 100 also includes a plurality of input and output interfaces for communicating with other devices, including media servers and presentation devices. A wired network interface 120 and a wireless network interface 125 each can be configured to permit the media client 100 to transmit and receive information over a network, such as a local area network (LAN) or the Internet. Additionally, an input interface 130 can be configured to receive input from another device through a direct connection, such as a USB or an IEEE 1394 connection.

Further, an output interface 135 can be configured to couple the media client 100 to one or more external devices, including a television, a monitor, an audio receiver, and one or more speakers. For example, the output interface 135 can include one or more of an optical audio interface, an RCA connector interface, a component video interface, and a High-Definition Multimedia Interface (HDMI). The output interface 135 also can be configured to provide one signal, such as an audio stream, to a first device and another signal, such as a video stream, to a second device. Further, a memory 140, such as a random access memory (RAM) and/or a read-only memory (ROM) also can be included in the media client 100. As with the storage device 110, a plurality of types of information, including configuration data and operating instructions, can be stored in the memory 140.

Additionally, the media client 100 can include a remote control interface 145 that can be configured to receive commands from one or more remote control devices (not pictured). The remote control interface 145 can receive the commands through wireless signals, such as infrared and radio frequency signals. The received commands can be utilized, such as by the processor 105, to control media playback or to configure the media client 100. In an implementation, the media client 100 can be configured to receive commands from a user through a touch screen interface. The media client 100 also can be configured to receive commands through one or more other input devices, including a keyboard, a keypad, a touch pad, a voice command system, and a mouse.

Figure 2:
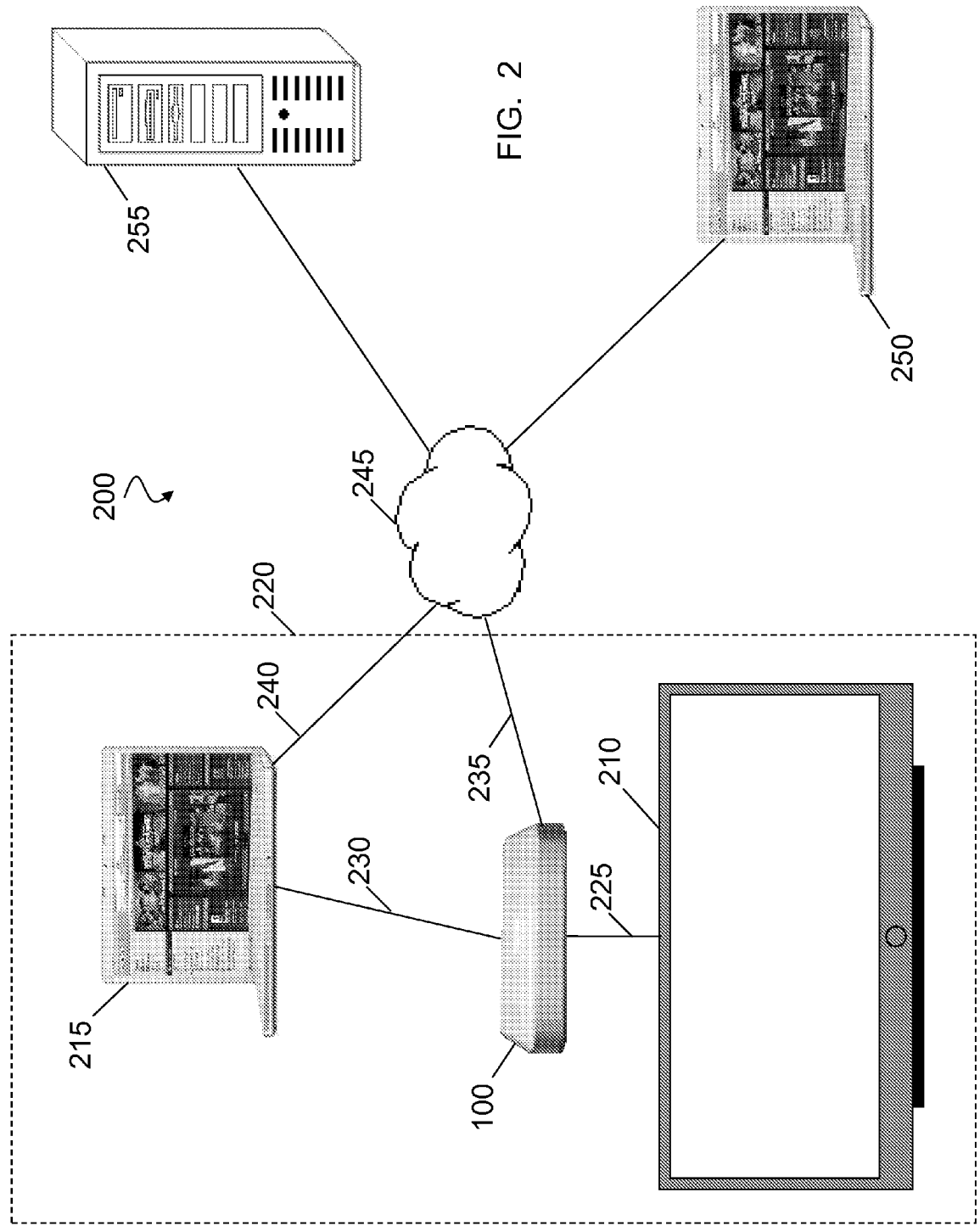
FIG. 2 presents a media system that includes a media client.

FIG. 2 presents a media system 200 that includes a media client 100. The media system 200 includes a host location 220, such as a home or office, in which the media client 100 is installed. The host location 220 also can include a local media server 215 and a presentation device, such as a monitor 210. The monitor 210 can be coupled to the media client 100 through a media connector 225, such that video and/or audio information output by the media client 100 can be presented through the monitor 210. Further, the media client 100 can be coupled to the local media server 215 through a local connection 230, such as a wired network connection, a wireless network connection, or a direct connection. As such, the media client 100 can receive media content from the local media server 215. The local media server 215 can be any computing device, including a personal computer, a server, a palm top computer, or a media device capable of storing and/or playing back media content.

Further, the media client 100 and the local media server 215 can include network connections 235 and 240 respectively, which provide access to a network 245, such as the Internet. In an implementation, the media client 100 can communicate with a remote media server 250 and/or a media store 255 over the network 245. For example, a connection can be established between the media client 100 and the remote media server 250. The connection can be secure or unsecure. Thereafter, the media client 100 can receive media content from the remote media server 250, such as by streaming or downloading.

Similarly, the media client 100 can be configured to receive media content from a media store 255. For example, upon establishing a connection, the media client 100 can request a list of available media content from the media store 255. The list of available media content can include free content, such as trailers and pod casts, and for-purchase content, such as movies, television programs, and music. Additionally, the media client 100 can be configured to communicate with the media store 255 to validate media content, such as by verifying digital rights management information.

Figure 3:
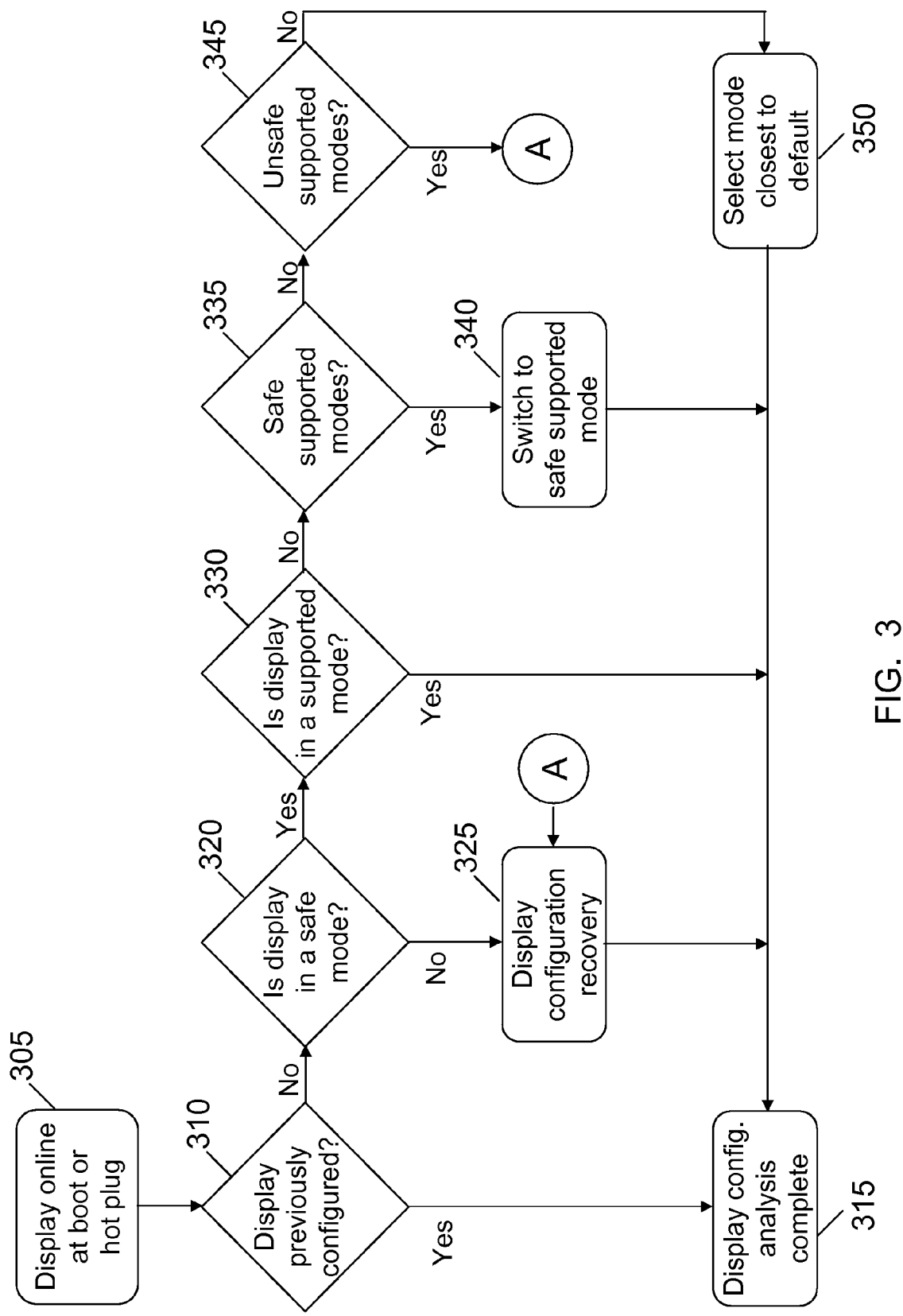
FIG. 3 presents a flowchart for analyzing a display configuration.

A media processing device, such as the media client 100, can be configured to select a particular display mode corresponding to the output of video or image data to a display device in response to any one of a plurality of display configuration events, including media processing device initialization (also referred to as "boot"), change of a coupled display device during operation (also referred to as "hot plug"), display error or detection of an unsafe mode, and user command. A display mode can identify display settings, including both a display resolution and a timing. FIG. 3 presents a flowchart for analyzing a display configuration.

The media client 100 can determine whether a display device is online when the media client 100 is initialized or when a coupled display device is changed during media client operation (305). Further, the media client 100 can determine whether the display device has previously been configured (310). For example, on boot, the media client 100 can determine whether the display device settings were restored from saved preferences.

Further, if the display device is configured to transmit identification information, such as Extended Display Identification Data (EDID), the media client 100 also can recognize the display device from the EDID. In an implementation, one or more of the values in the EDID, including the manufacturer name, product type, phosphor or filter type, timings supported by the display, display size, luminance data, and pixel mapping data, can be hashed to generate an identifier associated with the display device. The hashed identifier can be used to verify the identity of the display device during a boot or hot plug event. Additionally, the EDID can be used to determine one or more capabilities of the display device. If the display device has previously been configured, the display configuration analysis can be terminated (315).

If the display device has not previously been configured, the media client 100 can determine whether the existing display configuration corresponds to a safe mode (320). One or more of the display modes supported by the media client 100 can be predetermined to be safe. For example, all HDMI display modes can be designated as safe modes. Similarly, one or more display modes also can be predetermined to be unsafe. For example, the media client 100 can be configured to designate all display modes that utilize analog component timings as unsafe. If the existing display configuration does not correspond to a safe mode, a display configuration process, which is described in greater detail with respect to FIG. 4, can be executed (325). Once the display configuration process is complete, the display configuration analysis can be terminated (315).

If it is determined that the display configuration corresponds to a safe mode, the media client 100 can determine whether the display device also is in a display mode supported by the media client 100 (330). This can be performed automatically, such as by using the EDID, or manually, such as through user confirmation. If the display device is operating in a safe mode that is supported by the media client 100, the display configuration analysis can be terminated (315). Otherwise, the media client 100 can determine whether the display device supports one or more safe modes that also are supported by the media client 100 (335). If the display device can operate in one or more safe modes supported by the media client 100, the media client 100 can configure the output to correspond to one of the supported safe modes (340). For example, the media client 100 can be configured to select the compatible safe mode with the highest possible resolution. Once the media client 100 has been configured to output information to the display device in a compatible safe mode, the display configuration analysis can be terminated (315).

If the media client 100 determines that the display device cannot operate in any of the supported safe modes, the media client 100 further can determine whether the display device can operate in any unsafe modes that are supported by the media client 100 (345). If the display device can operate in an unsafe mode supported by the media client 100, a display configuration process can be executed (325). If the display device cannot operate in an unsafe mode supported by the media client 100, a compatible display mode closest to a default display mode can be selected (350). For example, a default display mode can be specified in the media client 100, such as a resolution of 720p and a timing of 60 Hz. If the media client 100 does not support a display mode that is compatible with a mode supported by the display device, then the media client 100 can select the display mode closest to the default mode that produces visible output on the display device. Once visible output is presented on the display device and confirmed by user input, the display configuration analysis can be terminated (315).

Figure 4:
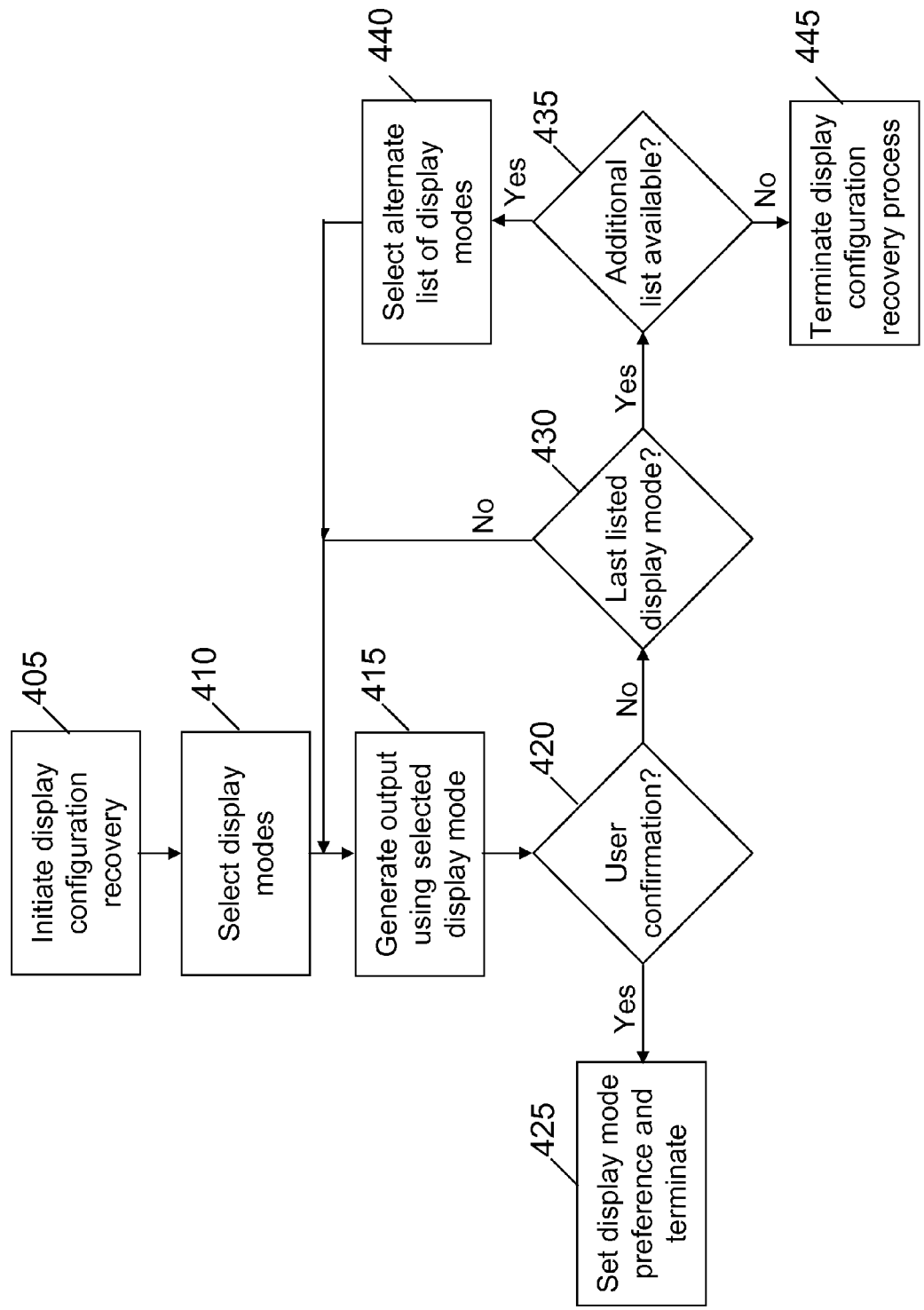
FIG. 4 presents a flowchart for performing a display configuration process.

FIG. 4 presents a flowchart for performing a display configuration process. In addition to responding to circumstances detected during a boot or hot plug event, the display configuration process also can be initiated in response to a command received from a user, such as through the selection of an option in a user interface or through one or more commands entered into a remote control device (405). In an implementation, a command can be received from a user through another input supported by the media client 100, including a touch screen, a keyboard, a keypad, a touch pad, a voice command system, and a mouse.

A media processing device, such as the media client 100, executing the display configuration process can select a list of one or more primary display modes (410). In an implementation, the list of primary display modes can be specified such that only safe modes are included. In another implementation, the list of primary display modes can be selected based on information included in an EDID received from a display device. Thus, one or more display modes not supported by the display device can be omitted from the list of primary display modes. The media client 100 can be configured to cycle through the list of primary display modes sequentially until a supported display mode that is compatible with the display device is identified. Further, a list of display modes also can be ordered based on one or more criteria, such as resolution or how commonly they are supported. For example, the most commonly supported display mode in a list can be ordered first, while the least commonly supported display mode can be ordered last. TABLE 1 presents an exemplary list of display modes.

| USER INTERFACE | RESOLUTION | TIMING |
| --- | --- | --- |
| 720p | 1280 × 720 | 720p60 |
| 720p | 1280 × 720 | 720p50 |
| 1080i | 1920 × 1080 | 1080i60 |
| 1080i | 1920 × 1080 | 1080i50 |
| 480p | 720 × 480 | 480p60 |
| 480i | 720 × 480 | 480i60 |
| 576p | 1024 × 576 | 576p |
| 576i | 1024 × 576 | 576i |

Further, the order in which the media client 100 cycles through a list of display modes can be set based on one or more preferences, such that one or more preferred display modes are attempted before other supported display modes. Thus, if a preferred display mode is compatible with the display device, the preferred display mode can be selected. For example, if the output of the media client 100 is optimized for standard high-definition display modes, the supported standard high-definition display modes can be attempted before other display modes. Similarly, if other high-definition display modes are preferred over standard definition modes, the other high-definition modes can be attempted before any of the standard definition modes. In this manner, the most highly preferred display mode that also is compatible with the display device can be selected.

The media client 100 generates output to the display device using a selected display mode from the current list of display modes (415). The output can include a prompt requesting the user to perform an action, such as entering a command, if the generated output is visible on the display device. The media client 100 can continue to generate output to the display device using the selected display mode for a predetermined period of time if no user input is received. For example, output can be transmitted to the display device using the selected display mode for at least 8 seconds in order to give a user time to respond to a displayed prompt. Additionally, the media client 100 can present audio output to a user. For example, the media client 100 can output a tone to indicate that a new display mode is being attempted. Further, a different tone can be associated with one or more other events, such as completing a traversal of the selected list of display modes or selecting a new list of display modes. During the predetermined period of time, the media client 100 can determine whether input has been received confirming that the generated output is visible on the display device (420). If confirming input has been received, the selected display mode can be recorded by the media client 100, such as in a preference file, and the display configuration process can be terminated (425).

If confirming input is not received during the predetermined period, the media client 100 can determine whether any other display modes remain in the current list of display modes (430). If at least one display mode remains, the media client 100 can generate output to the display device using a selected display mode from the current list (415). If all of the display modes in the current list of display modes have been attempted, the media client 100 can determine whether a list of alternative display modes is available (435). If a list of alternative display modes is available, the list is selected as the current list (440). The media client 100 can then generate output to the display device using a selected display mode from the current list (415).

If all of the display modes in the current list have been attempted and an alternative list of display modes is not available, the display configuration process is terminated (445). If all supported safe and unsafe modes have been attempted, the media client 100 can select a default display mode as part of the termination. In an implementation, the user can be instructed to verify the connection between the display device and the media client 100, and to then repeat the display configuration process.

In another implementation, the media client 100 can be configured to perform the display configuration process in accordance with commands received from a user. For example, the user can be permitted to increase the speed at which the display modes are attempted and/or manually control the progression from one display mode to the next. Similarly, the user can be permitted to move backward in the current list to select a display mode that already has been attempted.

If input is not received from the user, the media client 100 can execute the display configuration process automatically The media client 100 also can be configured to select between normal and wide screen modes. For example, the 576p display mode can have a resolution of 1024×576 when in 16:9 and a resolution of 768×576 when in 4:3. In an implementation, selection between normal and wide screen modes can be implemented as part of a configuration menu displayed in a user interface.

Figure 5:
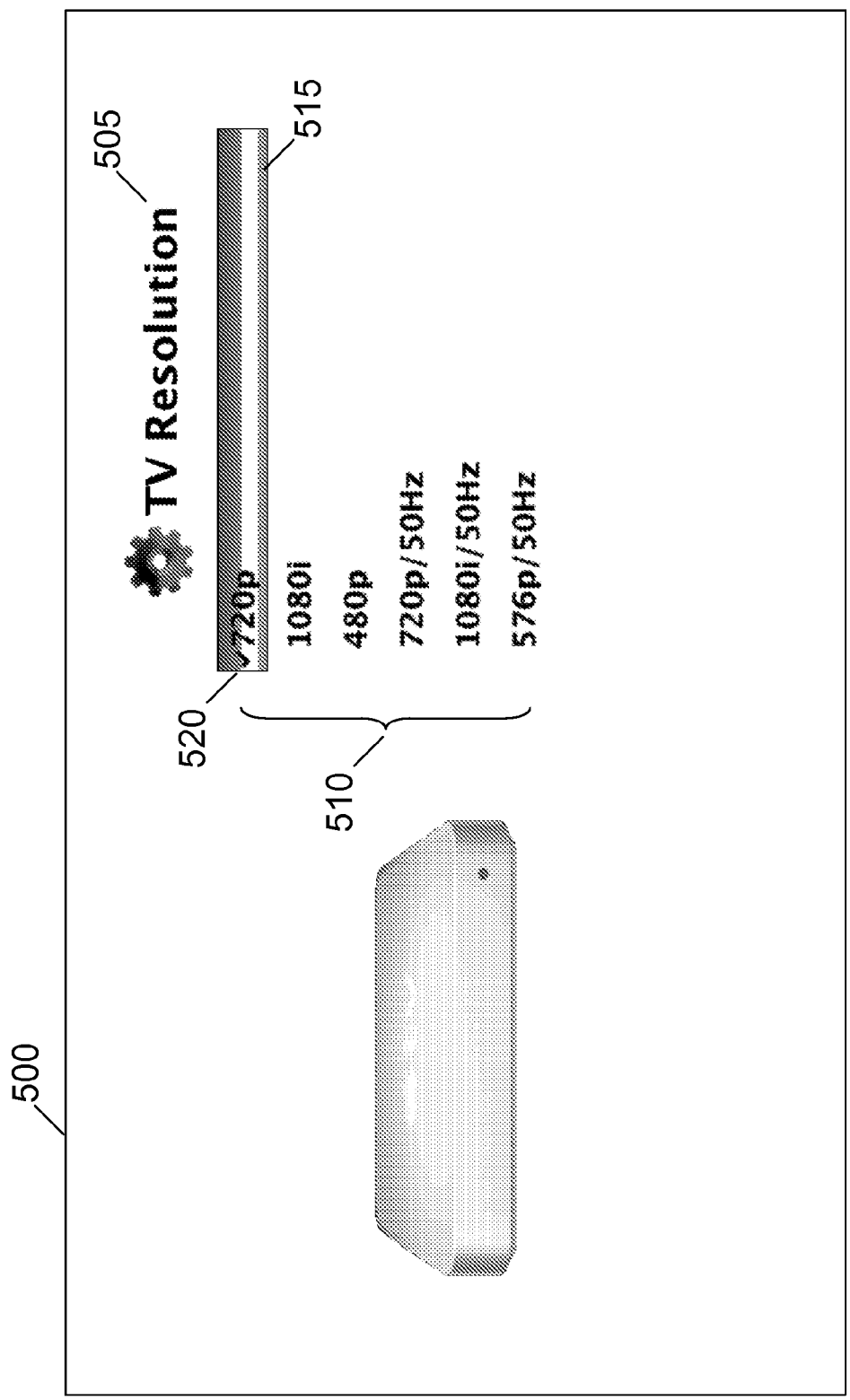
FIGS. 5-8 present example user interfaces for configuring display settings.

FIG. 5 presents an example user interface for selecting a display mode. The display configuration interface 500 can be output by the media client 100 to a coupled display device, such as through the output interface 135. Further, a display configuration heading 505 can be presented to indicate a type of one or more configuration settings presented in the display configuration interface 500. For example, the display configuration heading 505 "TV Resolution" can be presented to indicate that the one or more configuration settings presented in the display configuration interface 500 comprise display resolution and timing settings.

The display configuration interface 500 also can include a list of one or more display modes 510 supported by the media client 100. The list of one or more display modes 510 can be expressed as resolution and timing pairs. Alternatively, timing information can be displayed only for non-standard timings, such as 50 Hz. In an implementation, the list of display modes 510 can include each of the display modes supported by the media client 100. For example, all of the supported display modes can be presented if the coupled display device is not configured to provide identification data to the media client, such as an EDID, from which one or more supported display modes can be identified. All supported display modes also can be presented if the display device is coupled through an interface that does not support the exchange of identification data, such as a component video interface.

Further, a cursor 515 can be displayed to permit a user to highlight or otherwise indicate one of the configuration settings included in the list of display modes 510. For example, the cursor 515 can be positioned in response to input received by the media client 100 from a user, such as through a remote control device. Based on the received input, the cursor can be moved up and down within the list of display modes 510. Additionally, a configuration indicator 520 can be presented to identify the display mode the media client 100 is configured to use. In an implementation, the configuration indicator 520 can be any special character or distinguishing feature, such as underlining, highlighting, bold text, italicized text, a specific font, or other such visual attribute.

Figure 6:
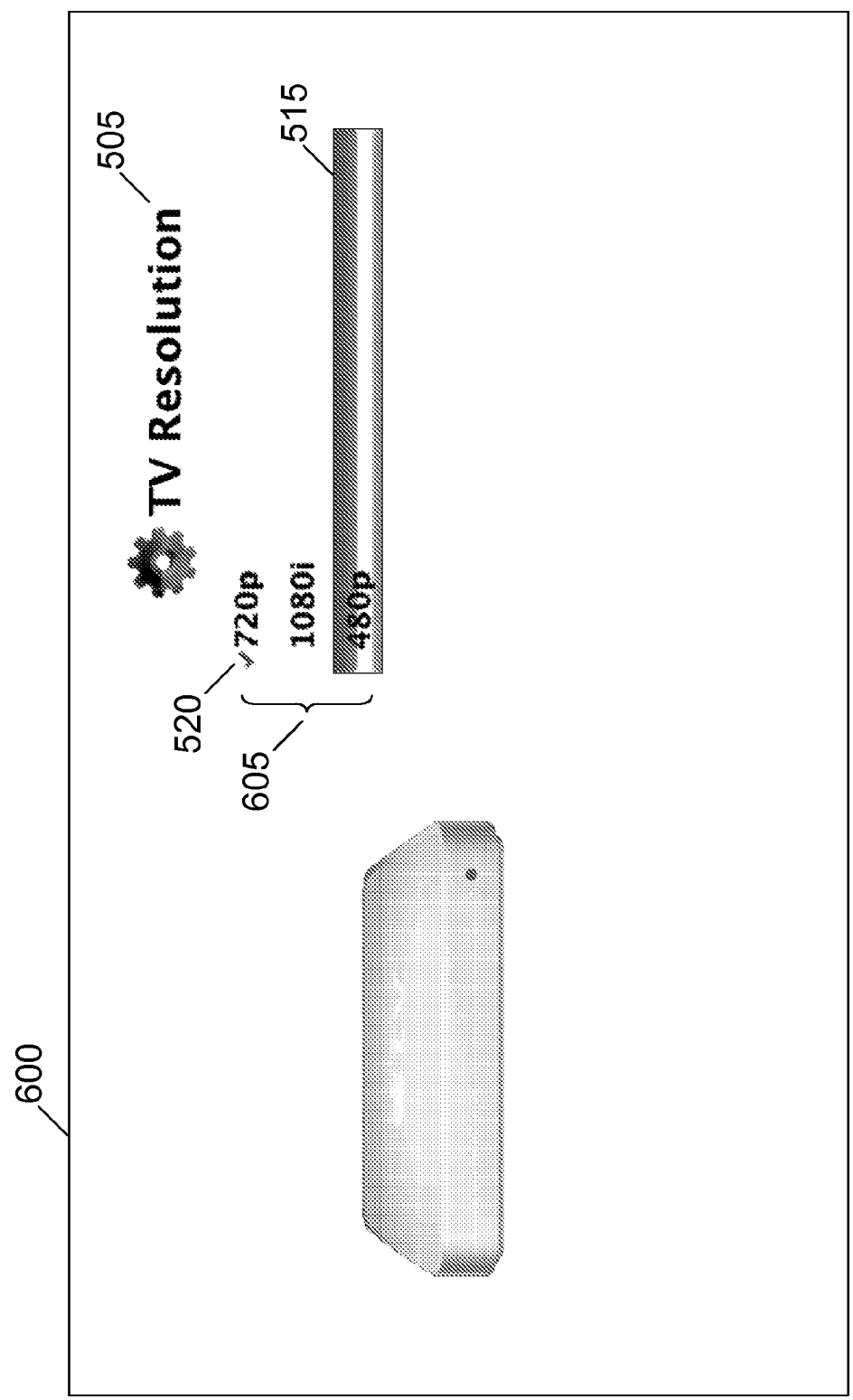

FIG. 6 also presents an example user interface for configuring a display setting. In the display configuration interface 600, the list of display modes 605 includes a subset of the display modes supported by the media client 100. The list of display modes 605 can be expressed as resolution and timing pairs. Alternatively, timing information can be displayed only for non-standard timings, such as 50 Hz.

Further, one or more filtering criteria can be used to determine which of the display modes supported by the media client 100 are to be included in the list of display modes 605. For example, the list of display modes 605 can include only the display modes that correspond to a safe mode of the media client 100. Alternatively, if the coupled display device is configured to provide identification data to the media client 100, such as an EDID, and the coupling interface supports the exchange of identification data, the list of display modes 605 can be generated such that the display modes supported by the coupled display device are presented. Therefore, a user can select a display mode only from the list of safe or supported display modes presented in the display configuration interface 600.

Figure 7:
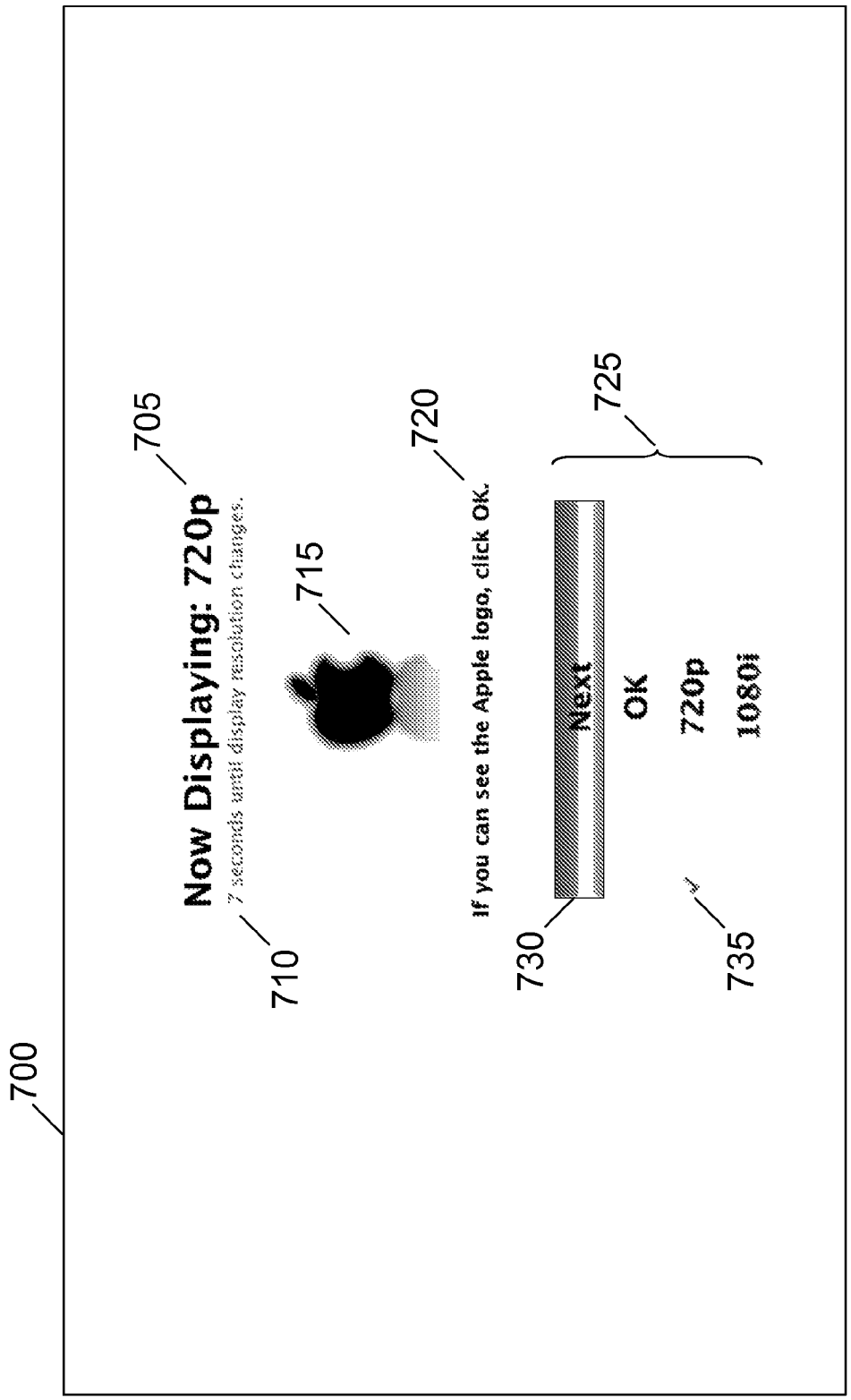

FIG. 7 presents an example of a user interface for confirming a display mode setting. The display mode interface 700 can be displayed in response to the selection of a display mode during a display configuration process, including both manually and automatically initiated display configuration processes. The display mode interface 700 includes a resolution identifier 705 that indicates the display mode used to generate the interface. Thus, a user can determine whether a selected display mode is compatible with the display device and can visually evaluate the selected display mode.

A display timer 710 also can be presented to indicate the time until the next display mode change. The media client 100 can be configured to reset the display timer 710 to a predetermined value in response to an event, such as repositioning a cursor 730 in an associated command menu 725. In an implementation, the display timer 710 can be configured to count down from a predetermined value, such as by the second. For example, the media client 100 can be configured to sequentially present output to a coupled display device in accordance with one or more of a plurality of supported display modes. The media client 100 can generate output using one of the plurality of supported display modes for a predetermined period of time before switching to a different display mode if an appropriate command has not been received from the user. In an implementation, the media client 100 can be configured to switch to a default or current display setting upon the expiration of a predetermined period of time if an appropriate command has be not received from a user.

Further, a test image 715 and a user prompt 720 can be presented to prompt the user to perform an action if the display mode interface 700 is visible on the coupled display device. For example, the user prompt 720 can instruct the user to provide a confirmation input, such as by selecting OK from a command menu 725, if the test image 715, such as the Apple® logo, is visibly displayed. Further, the test image 715 can include one or more graphical characteristics, including patterns and shading, to assist the user in evaluating the quality of the selected display mode. For example, the test image 715 can be structured to demonstrate how one or more attributes, such as sharpness and contrast, will be perceived in a particular display mode.

Based on user response to the prompt, the media client 100 can determine whether the corresponding display mode is compatible with the coupled display device. In an implementation, receiving a confirmation input from a user signals the media client 100 to set the current display mode as the operating display mode and to terminate the display configuration process. Alternatively, the media client 100 can be configured to continue with the display configuration process, noting each compatible display mode identified by the user.

Additionally, the display mode interface 700 can include a command menu 725 comprised of one or more user selectable commands, such as NEXT, OK, BACK, etc., and one or more display modes. The one or more display modes can be expressed as resolution and timing pairs. Alternatively, the timing information can be displayed only for non-standard timings, such as 50 Hz. A cursor 730 associated with the command menu 725 can be used to navigate through the list of commands and display modes. For example, the cursor 730 can be positioned in response to one or more user commands entered through a remote control or touch-screen interface. Further, a user can instruct the media client 100 to perform the command indicated by the cursor 730 by selecting that command.

In an implementation, the NEXT command can be ordered first in the command menu 725. Thus, upon presenting the display mode interface 700 for a particular display mode, the cursor can be positioned such that it highlights the NEXT command. If the display mode interface 700 is not visible on the display device, an erroneous command selection entered by the user will cause the media client 100 to advance to the next display mode before the predetermined time period has expired. Thus, the likelihood that an erroneous command will result in the media client 100 being configured to operate using an incompatible display mode is reduced.

If the display mode interface 700 is visible on the coupled display device and the display quality is acceptable to the user, the user can configure the media client 100 to operate using the current display mode by selecting the OK command from the command menu 725. Alternatively, if the display mode interface 700 is visible on the coupled display device, but the user would like to evaluate a different display mode, the user can select a display mode from the command menu 725. Upon receiving a user command indicating the selected display mode, the media client 100 can generate output at the selected resolution and timing to the display device in the form of a newly generated display mode interface 700. Additionally, the display mode interface 700 also can include a configuration indicator 735 to identify the display mode in which the media client 100 is configured to operate.

Figure 8:
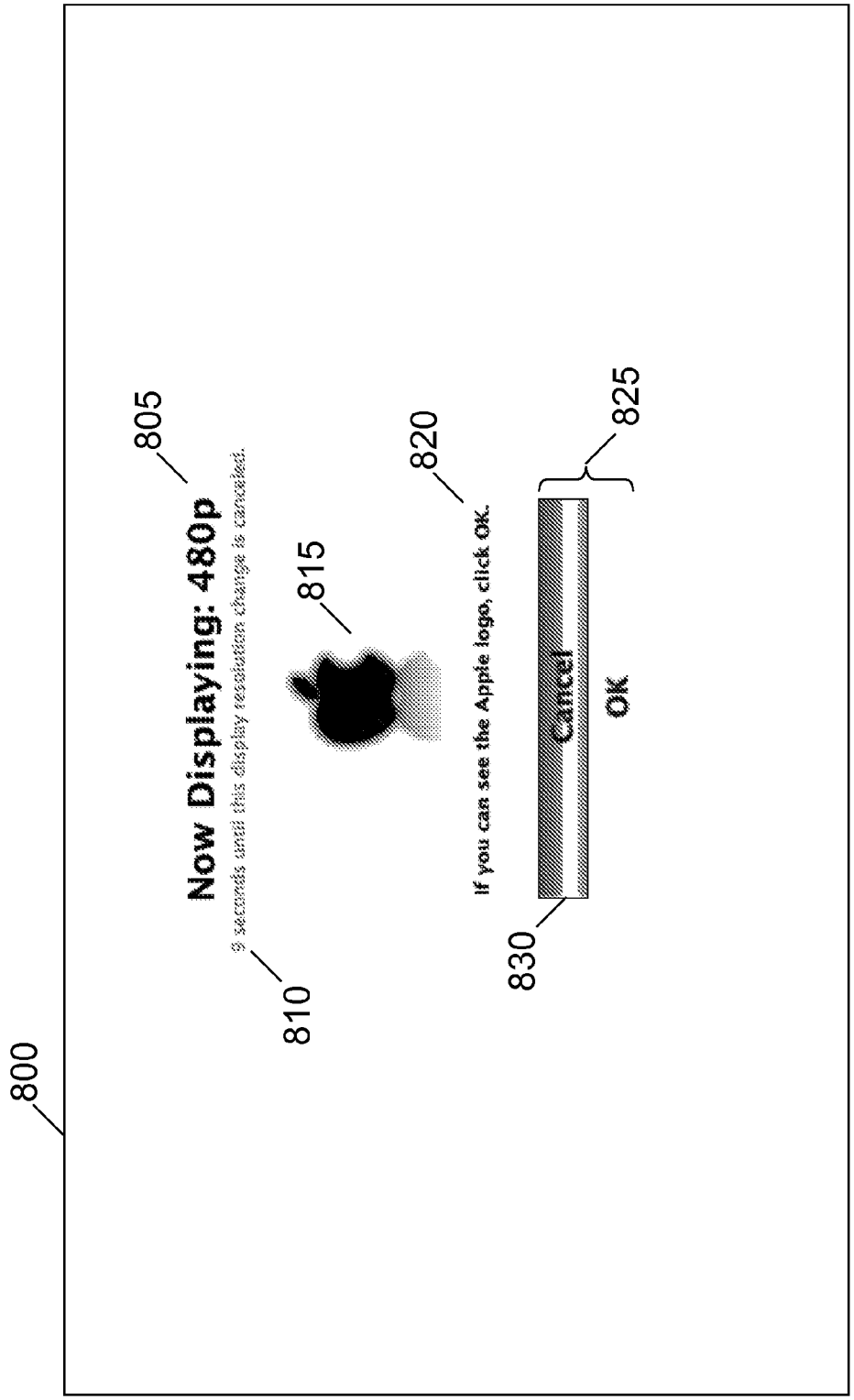

FIG. 8 also presents an example user interface for configuring a display setting. The display confirmation interface 800 can include a resolution identifier 805 that indicates the display mode used to generate the interface. Further, the display confirmation interface 800 can include a display timer 810 that indicates the time remaining until the display mode change is canceled. For example, if user input confirming the display mode change is not received within a predetermined amount of time, the display mode change is canceled and the media device 100 configuration is not changed. Further, the media client 100 can be configured to reset the display timer 810 to a predetermined value in response to an event, such as repositioning a cursor 830 in an associated confirmation menu 825.

A test image 815 and a user prompt 820 also can be presented to prompt the user to perform an action if the display confirmation interface 800 is visible on the coupled display device. The test image 815 can include one or more graphical characteristics, including patterns and shading, to assist the user in evaluating the quality of the selected display mode. For example, the test image 815 can be structured to demonstrate how one or more attributes, such as sharpness and contrast, will be perceived in a particular display mode. Further, a confirmation menu 825 can be presented to permit the user to cancel or accept the display mode change. For example, if the user finds the visual quality of the display confirmation interface 800 to be satisfactory, the user can accept the selected display mode. Alternatively, if the display confirmation interface 800 is not visibly displayed or the quality is unsatisfactory, the user can reject the selected display mode.

A display mode change can be accepted by positioning the cursor 830 over the appropriate entry in the confirmation menu 825 and providing input selecting that entry, such as a command entered through a remote control or a touch-screen interface. For example, the user can select the confirmation menu 825 entry "OK" to accept the display mode change. Further, the confirmation menu 825 can be configured such that the cursor 830 appears by default over the entry to cancel a display mode change, such as the entry "CANCEL". Thus, if the display confirmation interface 800 is not visibly displayed on the display device, an erroneous user selection will cause the display mode change to be canceled.

Figure 9:
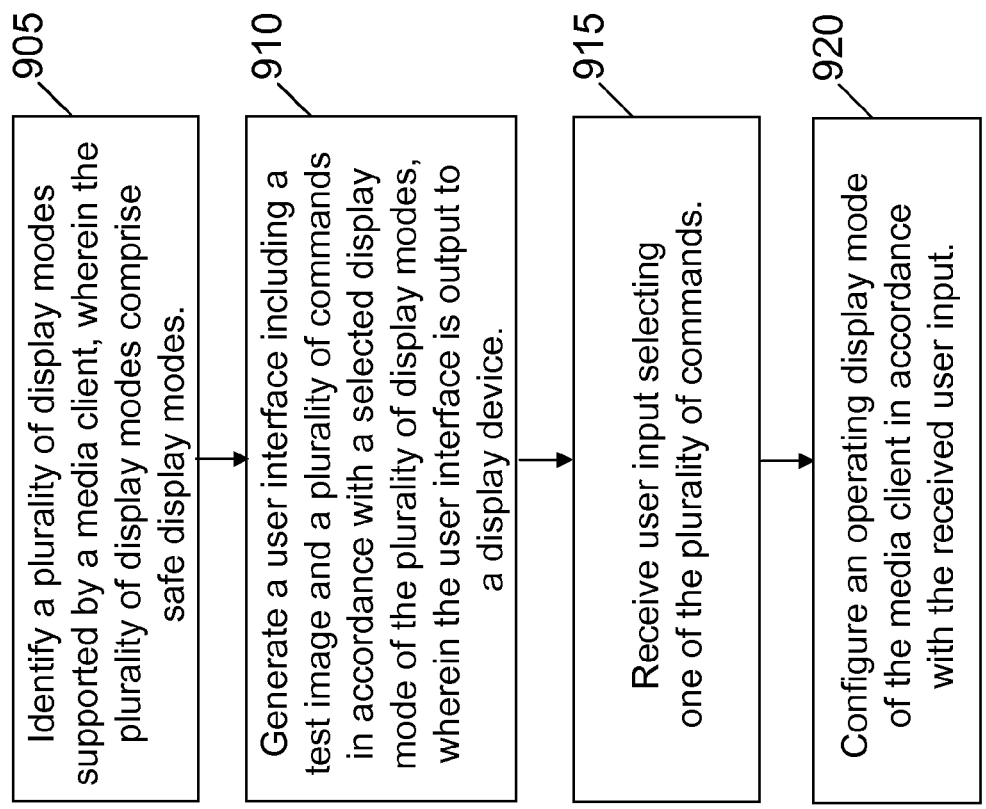
FIG. 9 presents a computer-implemented method of selecting a display mode.

FIG. 9 describes a computer-implemented method of selecting a display mode. In a first step 905, a plurality of display modes that are supported by a media client are identified, wherein the plurality of display modes comprise safe display modes. In a second step 910, a user interface including a test image and a plurality of commands is generated in accordance with a selected display mode of the plurality of display modes, wherein the user interface is output to a display device. In a third step 915, user input selecting one of the plurality of commands is received. Once the user input has been received, a fourth step 920 is to configure an operating display mode of the media client in accordance with the received user input.

A number of implementations have been disclosed herein. Nevertheless, it will be understood that various modifications may be made without departing from the spirit and scope of the claims. Accordingly, other implementations are within the scope of the following claims.

What is claimed is:

1. A computer-implemented method, comprising:
    determining, at a computing device, whether a display device is initialized, wherein the display device has an associated display configuration;
    responsive to determining that the display device is initialized, determining whether the display device was previously configured, wherein when the display device has not been previously configured, analyzing the associated display configuration to determine whether the associated display configuration corresponds to a safe mode;
    executing a display configuration process when the associated display configuration does not correspond to a safe mode, the display configuration process comprising:
        displaying a graphical interface during the display configuration process, wherein the graphical interface includes a list of one of more optional modes, wherein each optional mode is selectable, wherein each optional mode has an associated test image and an associated display timer, and wherein each associated display timer includes a predetermined amount of time;
        sequentially cycling through the list of one or more optional modes during the display configuration process until an optional mode is identified as compatible with the display device, wherein sequentially cycling includes counting down the predetermined amount of time for each optional mode, and generating an output signal including the associated test image for each optional mode; and
    terminating the display configuration process when an optional mode is identified as compatible with the display device;
    wherein when the associated display configuration corresponds to a safe mode, determining whether the safe mode is a supported mode;
    when the safe mode is a supported mode, configuring the output signal, and
    when the safe mode is not a supported mode, analyzing one or more unsafe modes to determine whether the one or more unsafe modes are supported modes and configuring the output signal when an unsafe mode is a supported mode.

2. The method of claim 1, wherein when an unsafe mode is not a supported mode, one or other modes are analyzed to determine which of the one or more other modes is closest to a predetermined default mode, and wherein an output signal is configured using the mode closest to the predetermined default mode.

3. The method of claim 1, further comprising:
    determining whether the display device is configured to transmit identification information, wherein transmitted identification information is hashed, wherein the hashed identification information is used to generate an identifier, and wherein the identifier is associated with the display device.

4. The method of claim 3, wherein the identifier associated with the display device is used to generate the list of one of more optional modes.

5. The method of claim 1, wherein when the display device has been previously configured one or more settings of the display device are restored, and wherein the output signal is configured according to the one or more settings.

6. The method of claim 1, wherein sequentially cycling through the list of one or more optional modes includes sequentially cycling until each of the optional modes in the list has been considered, and wherein the display configuration process is terminated when each of the optional modes in the list has been considered.

7. The method of claim 1, wherein the graphical interface includes a default selection.

8. The method of claim 1, wherein sequentially cycling includes an audio output.

9. A system, comprising:
one or more processors;
a non-transitory computer-readable storage medium containing instructions configured to cause the one or more processors to perform operations, including:
determining whether a display device is initialized, wherein the display device has an associated display configuration;
responsive to determining that the display device is initialized, determining whether the display device was previously configured, wherein when the display device has not been previously configured, analyzing the associated display configuration to determine whether the associated display configuration corresponds to a safe mode;
executing a display configuration process when the associated display configuration does not correspond to a safe mode, the display configuration process comprising:
displaying a graphical interface during the display configuration process, wherein the graphical interface includes a list of one of more optional modes, wherein each optional mode is selectable, wherein each optional mode has an associated test image and an associated display timer, and wherein each associated display timer includes a predetermined amount of time;
sequentially cycling through the list of one or more optional modes during the display configuration process until an optional mode is identified as compatible with the display device, wherein sequentially cycling includes counting down the predetermined amount of time for each optional mode, and generating an output signal including the associated test image for each optional mode; and
terminating the display configuration process when an optional mode is identified as compatible with the display device;
wherein when the associated display configuration corresponds to a safe mode, determining whether the safe mode is a supported mode;
when the safe mode is a supported mode, configuring an output signal, and
when the safe mode is not a supported mode, analyzing one or more unsafe modes to determine whether the one or more unsafe modes are supported modes and configuring the output signal when an unsafe mode is a supported mode.

10. The system of claim 9, wherein when an unsafe mode is not a supported mode, one or other modes are analyzed to determine which of the one or more other modes is closest to a predetermined default mode, and wherein an output signal is configured using the mode closest to the predetermined default mode.

11. The system of claim 9, further comprising instructions configured to cause the one or more processors to perform operations, including:
determining whether the display device is configured to transmit identification information, wherein transmitted identification information is hashed, wherein the hashed identification information is used to generate an identifier, and wherein the identifier is associated with the display device.

12. The system of claim 11, wherein the identifier associated with the display device is used to generate the list of one of more optional modes.

13. The system of claim 9, wherein when the display device has been previously configured one or more settings of the display device are restored, and wherein the output signal is configured according to the one or more settings.

14. The system of claim 9, wherein sequentially cycling through the list of one or more optional modes includes sequentially cycling until each of the optional modes in the list has been considered, and wherein the display configuration process is terminated when each of the optional modes in the list has been considered.

15. The system of claim 9, wherein the graphical interface includes a default selection.

16. The system of claim 9, wherein sequentially cycling includes an audio output.

17. A computer-program product, tangibly embodied in a non-transitory machine-readable storage medium, including instructions configured to cause a data processing apparatus to:
determine whether a display device is initialized, wherein the display device has an associated display configuration;
responsive to determining that the display device is initialized, determine whether the display device was previously configured, wherein when the display device has not been previously configured, analyzing the associated display configuration to determine whether the associated display configuration corresponds to a safe mode;
execute a display configuration process when the associated display configuration does not correspond to a safe mode, the display configuration process comprising:
display a graphical interface during the display configuration process, wherein the graphical interface includes a list of one of more optional modes, wherein each optional mode is selectable, wherein each optional mode has an associated test image and an associated display timer, and wherein each associated display timer includes a predetermined amount of time;
sequentially cycle through the list of one or more optional modes during the display configuration process until an optional mode is identified as compatible with the display device, wherein sequentially cycling includes counting down the predetermined amount of time for each optional mode, and generating an output signal including the associated test image for each optional mode; and
terminate the display configuration process when an optional mode is identified as compatible with the display device;
wherein when the associated display configuration corresponds to a safe mode, determining whether the safe mode is a supported mode;
when the safe mode is a supported mode, configuring an output signal, and
when the safe mode is not a supported mode, analyzing one or more unsafe modes to determine whether the one or more unsafe modes are supported modes and configuring the output signal when an unsafe mode is a supported mode.

18. The computer-program product of claim 17, wherein when an unsafe mode is not a supported mode, one or other modes are analyzed to determine which of the one or more other modes is closest to a predetermined default mode, and wherein an output signal is configured using the mode closest to the predetermined default mode.

19. The computer-program product of claim 17, further comprising instructions configured to cause a data processing apparatus to:

determine whether the display device is configured to transmit identification information, wherein transmitted identification information is hashed, wherein the hashed identification information is used to generate an identifier, and wherein the identifier is associated with the display device.

20. The computer-program product of claim 19, wherein the identifier associated with the display device is used to generate the list of one of more optional modes.

21. The computer-program product of claim 17, wherein when the display device has been previously configured one or more settings of the display device are restored and wherein the output signal is configured according to the one or more settings.

22. The computer-program product of claim 17, wherein sequentially cycling through the list of one or more optional modes includes sequentially cycling until each of the optional modes in the list has been considered, and wherein the display configuration process is terminated when each of the optional modes in the list has been considered.

23. The computer-program product of claim 17, wherein the graphical interface includes a default selection.

24. The computer-program product of claim 17, wherein sequentially cycling includes an audio output.

* * * * *

UNITED STATES PATENT AND TRADEMARK OFFICE
CERTIFICATE OF CORRECTION

PATENT NO. : 8,607,144 B2
APPLICATION NO. : 11/676150
DATED : December 10, 2013
INVENTOR(S) : Brodersen et al.

It is certified that error appears in the above-identified patent and that said Letters Patent is hereby corrected as shown below:

On the title page, in column 2, References Cited, under "Other Publications", line 1, delete "Shinder." and insert --Shinder,--, therefor On title page 2, in column 2, References Cited, under "Other Publications", line 23, delete "No. 1,2000," and insert --No. 1, 2000,--, therefor On title page 2, in column 2, References Cited, under "Other Publications", line 29, delete "Feb." and insert --Sep.--, therefor On title page 2, in column 2, References Cited, under "Other Publications", line 41, delete "26," and insert --23,--, therefor On title page 2, in column 2, References Cited, under "Other Publications", line 60, delete "M," and insert --M.,--, therefor In the Claims In column 12, line 19, in Claim 1, delete "of" and insert --or--, therefor In column 12, line 60, in Claim 4, delete "of" and insert --or--, therefor In column 13, line 30, in Claim 9, delete "of" and insert --or--, therefor In column 14, line 6, in Claim 12, delete "of" and insert --or--, therefor In column 14, line 40, in Claim 17, delete "of" and insert --or--, therefor Signed and Sealed this
Fifteenth Day of April, 2014

Michelle K. Lee
*Deputy Director of the United States Patent and Trademark Office*

In column 15, line 16, in Claim 20, delete "of" and insert --or--, therefor

In column 15, line 19, in Claim 21, delete "restored" and insert --restored,--, therefor